Dec. 26, 1967  P. O. BERG  3,360,167
APPARATUS FOR CONTROLLING THE FLOW OF FINELY DIVIDED MATERIAL
Filed Oct. 18, 1965  4 Sheets-Sheet 1

INVENTOR
PAUL O. BERG
BY Hood, Gust & Irish
ATTORNEYS

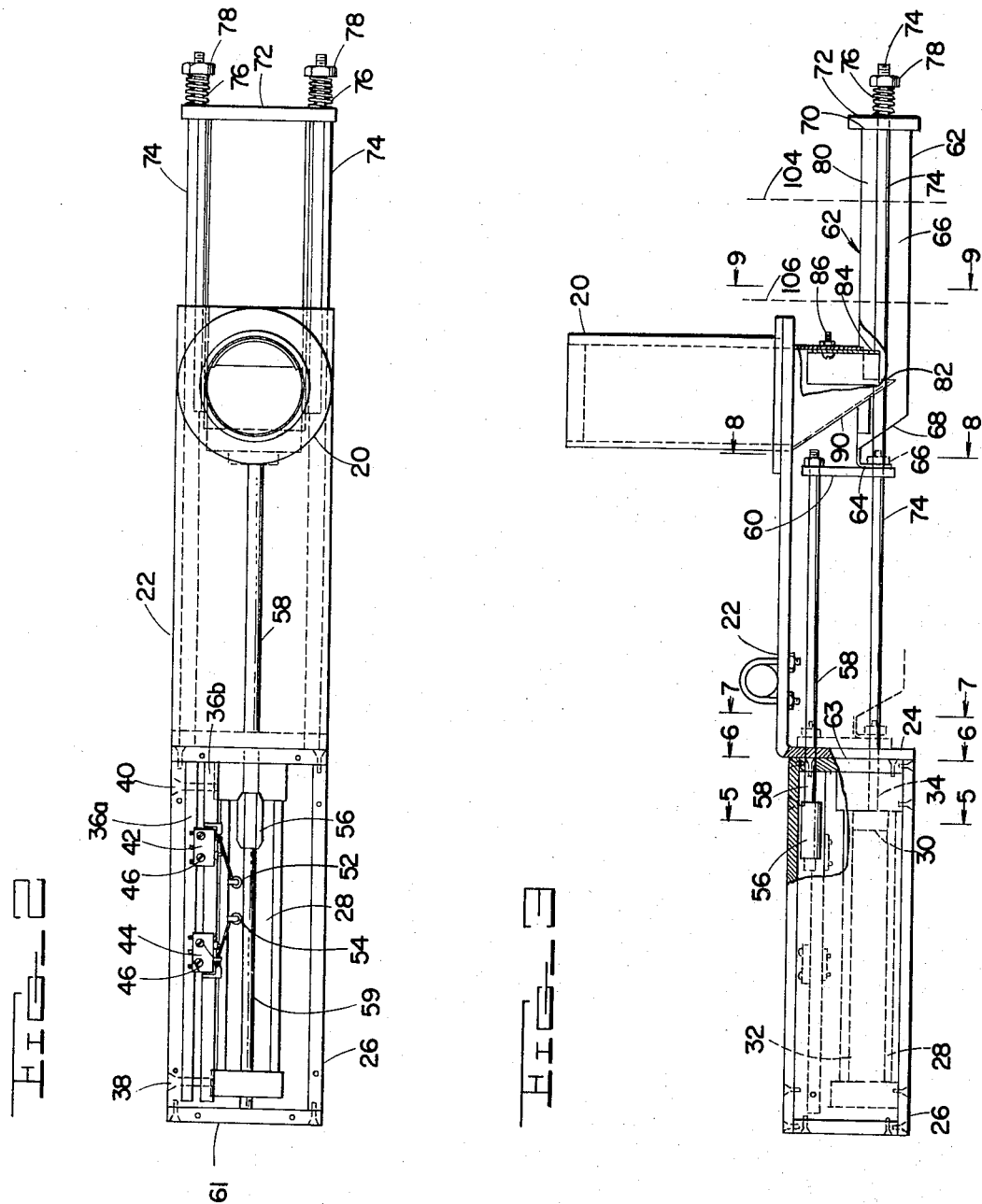

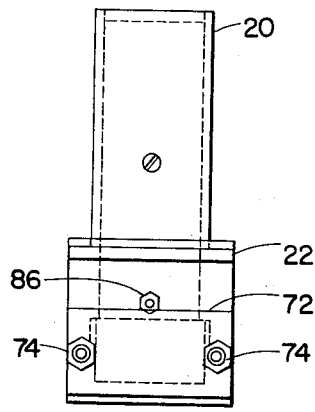
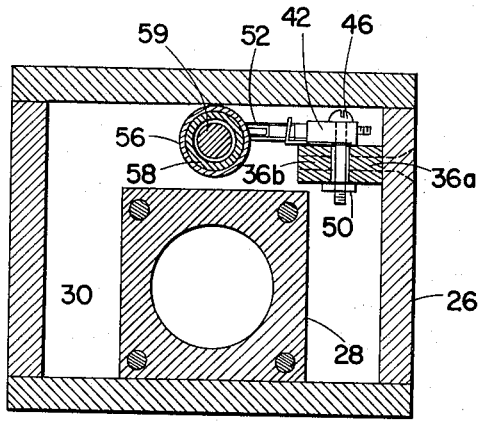
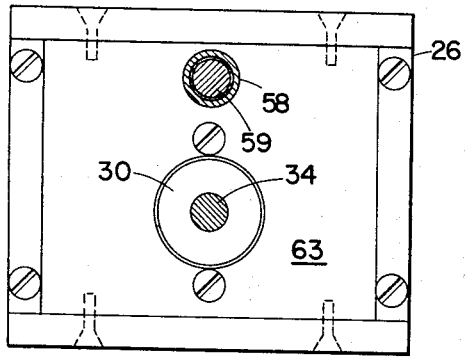
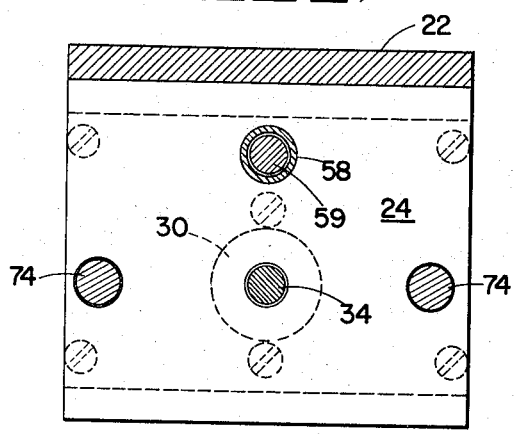

Dec. 26, 1967     P. O. BERG     3,360,167
APPARATUS FOR CONTROLLING THE FLOW OF FINELY DIVIDED MATERIAL
Filed Oct. 18, 1965     4 Sheets-Sheet 4
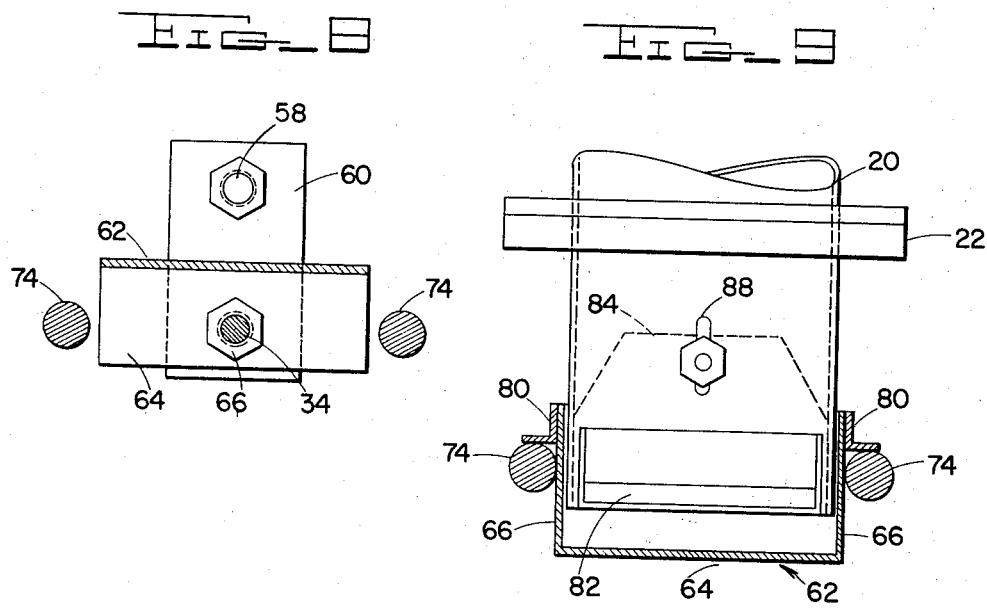
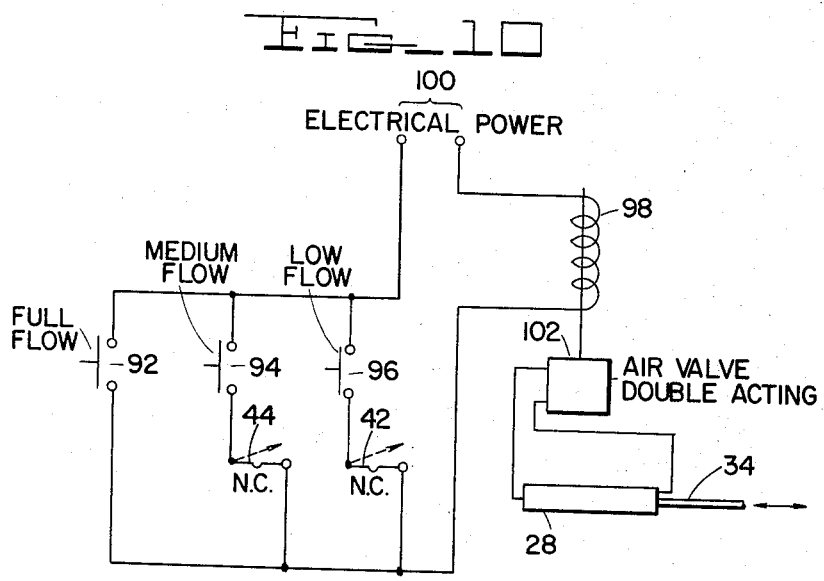
INVENTOR
PAUL O. BERG
BY Hood, Gust & Irish
ATTORNEYS

United States Patent Office 3,360,167
Patented Dec. 26, 1967

3,360,167
APPARATUS FOR CONTROLLING THE FLOW
OF FINELY DIVIDED MATERIAL
Paul O. Berg, 2217 Indian Village Blvd.,
Fort Wayne, Ind. 46807
Filed Oct. 18, 1965, Ser. No. 497,047
8 Claims. (Cl. 222—199)

The present invention relates to an apparatus for controlling the flow of finely divided solid material, and more particularly to an apparatus for controllably discharging a predetermined weight or amount of material from a bin or the like.

Industries follow formulas or recipes for making batches of different compounds. Such batches with which this invention is primarily concerned include flowable materials composed of solid particles. Included among these materials are those used in making feed for farm animals.

The formulas include various amounts of ingredients, some of these being large in quantity and others extremely small in comparison. The equipment handling the larger representations is correspondingly large, such equipment including storage bins, feeders and scales. For handling the smaller representations, such large equipment cannot be used in order to obtain accurate feeding and measurement thereof.

With respect to these items which are dispensed in smaller quantities, they are normally stored and dispensed from bottles, drums, bags of fifty (50) pounds or less, etc., these quantities being familiar to those engaged in the feed industry. According to one conventional method, these ingredients are grouped around a weighing scale and by the use of an ordinary hand-held scoop, a quantity of an ingredient is carefully shaken into a container on the scale until the proper weight is reached. Some work has been done in connection with improving the physical position of the ingredients with respect to the scale hopper, for example by positioning the various ingredients about a scale hopper or arranging them on opposite sides of the scale where they may be reached conveniently and expeditiously.

Such prior art arrangements for weighing out and mixing batches containing large and small representations of the different ingredients is not only cumbersome and slow, but is also liable to errors and contamination. The present invention is intended to overcome these as well as other deficiencies in the prior art.

It is an object of this invention to provide an apparatus for dispensing accurately and within a minimum of time quantities of different ingredients for weighing and mixing.

It is another object of this invention to provide an apparatus capable of adjustment to dispense accurately and at a maximum rate predetermined quantities of different materials, whether such materials be in large or small quantities.

It is yet another object of this invention to provide in an apparatus for dispensing flowable materials an arrangement capable of metering incremental quantities of given, flowable ingredients, even though such quantities may be extremely small and large, respectively, in comparison.

The above-mentioned and other features and objects of this invention and the manner of attaining them will become more apparent and the invention itself will be best understood by reference to the following description of an embodiment of the invention taken in conjunction with the accompanying drawings, wherein:

FIG. 2 is a top plan view of the portion of the apparatus of FIG. 1 which controls the metering or feeding of material from overhead bins;

FIG. 3 is a side view of the arrangement of FIG. 2, partially broken away and sectioned for clarity;

FIG. 4 is a front view thereof;

FIG. 5 is a cross-section taken substantially on section line 5—5 of FIG. 3;

FIG. 6 is a cross-section taken substantially along section line 6—6 of FIG. 3;

FIG. 7 is a cross-section taken substantially along section line 7—7 of FIG. 3;

FIG. 8 is a cross-section taken substantially along section line 8—8 of FIG. 3;

FIG. 9 is a cross-section taken substantially along section line 9—9 of FIG. 3; and FIG. 10 is a diagram of the electrical circuitry used in controlling the operation of the apparatus disclosed in the preceding figures.

Figure 1:
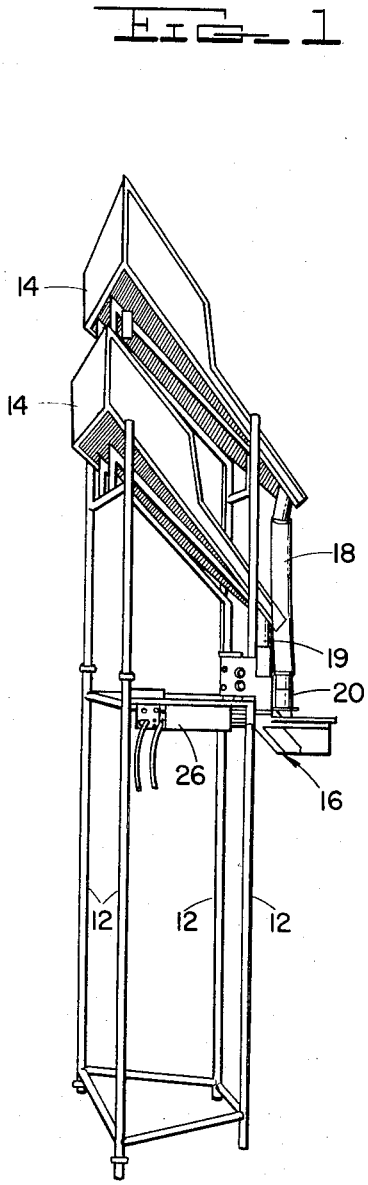
FIG. 1 is a perspective illustration of one embodiment of this invention.

Referring to the drawings, and more particularly to FIG. 1, an upright frame having legs 12 formed of suitably strong tubular steel has removably mounted in the top portion thereof a plurality of bins 14, one above the other. These bins may be mounted in the illustrated position by means of any suitable mechanism, but preferably they are removably fixed in position so that they may be conveniently removed from the supporting frame, loaded with feed material and then repositioned in the frame.

Situated beneath the bins 14 is a feeding mechanism illustrated generally by the reference numeral 16, this particular mechanism being adapted to receive a gravitating flow of material from bins 14 and dispensing this material in closely controlled quantities. This mechanism 16 is illustrated in detail in FIGS. 2 through 9 and will now be described.

As shown in FIG. 1, the bins 14 are inclined so that material will flow from the lowermost ends thereof. Attached to and depending from these lowermost ends are vertical conduits 18 and 19, respectively, which lead directly to the feeding mechanism 16. The lower ends of these vertical conduits 18 and 19 (and conduit 18 will be considered only from here on in the disclosure) are attached to respective spouts or conduit stubs such as stub 20 as shown in FIGS. 2, 3, 4 and 9. This stub is directly mounted on a supporting bracket 22 having a right angle flange 24 at the rear thereof.

Attached to the flange 24 is a box or housing 26 which has mounted therein an air cylinder 28 provided with piston 30. This particular power cylinder is single-acting, having a return spring 32 which yieldably urges the piston 30 toward its extreme rightward position (as viewed in FIG. 3), which is the position at which the piston rod 34 is protracted.

Immediately above and to one side of the cylinder 28, as more clearly shown in FIGS. 2, 3, and 5, two parallel extending and laterally spaced-apart mounting bars 36a and 36b are secured to the side of the housing 26. FIGS. 2 and 5 show these bars 36a and 36b as extending parallel to the axis of the power cylinder 28 and as being held in parallel spaced-apart alignment by means of two screws 38 and 40 passed through one side of the housing 26 and threaded into both of the bars 36a and 36b.

Secured to these bars 36a, 36b are two normally closed electrical switches 42 and 44 which are longitudinally spaced-apart a desired distance as shown clearly in FIG. 2. This distance may be adjusted by means of the screws 46 and 48 which attach the two switches 42 and 44, respectively, to the bars 36a, 36b. The screws 46 and 48 pass through the space between the two bars 36a and 36b as shown in FIG. 5 and have threaded thereonto nuts 50 for securely and rigidly fastening the switches to the bars.

Extending laterally from the switches 42 and 44 are two actuating arms, respectively, 52 and 54. These arms are longitudinally spaced-apart and disposed in the path of an elongated cam 56 mounted on the end of a follower tube 58 which reciprocally slides over a supporting rod 59 and passes through the end of the housing 26 and also the bracket flange 24. The rod 59 is secured at its left end to the end plate 61 of the housing 26, and projects a short distance through and beyond the opposite end plate 63. Preferably, the housing 26 is air and dust-tight such that all rods and items which extend through the housing are sealed thereto by the use of conventional gaskets and the like.

The follower tube 58 in the preferred embodiment of this invention is disposed immediately above and in parallelism with the piston rod 34 as clearly shown in FIGS. 2 and 3.

The switch arms 52 and 54 are so positioned that as the cam 56 is moved toward the left as viewed in FIG. 2, first the switch arm 52 will be engaged and swung inwardly for the purpose of opening the switch 42. Continued leftward movement of the cam 56, again as viewed in FIG. 2, results in the cam leaving the arm 52 (such that the switch 42 again closes) and engaging the arm 54 so as to open the switch 44. Continued leftward movement of the cam results in the arm 54 riding over the cam until the engagement is broken, at which time the switch 44 is opened. The reason for this action will be explained in more detail later on.

As shown in FIG. 3, attached to the extreme right-hand end of the follower tube 58 is a link 60 which is also securely attached to the extreme right-hand end of the piston rod 34. Attached to the right-hand side of this link 60 as viewed in FIG. 3 is one end of a metering tray 62, this tray having a short, right-angle flange 64 abutted against the link 60 and securely attached thereto by means of a nut 66 threaded over the end of the piston rod 34. This attachment is shown also in FIG. 8.

The tray 62 is substantially of rectangular shape and is provided with a flat bottom 64 and two upstanding, longitudinally extending sides 66. The left-hand end of the tray 62 is closed and inclined as shown at 68. The right-hand end of the tray 70 (FIG. 3) is open. This open end is engageable with a flat plate 72, characterized as a shut-off gate, which is slidably mounted on and carried in the illustrated position by means of two horizontally extending parallel rods 74. Two compression springs 76 surrounding these two rods 74 bear against the right-hand side of the gate 72 and are held in position by means of two nuts 78 threaded onto the right-hand ends of the rods 74. The gate 72 is held against two shoulders on the rods 74, thus limiting the leftward movement of the gate 72 on the rods 74. The gate 72, however, can move toward the right on the rods 74 until the springs 76 are totally compressed.

The tray 62 is engageable with the gate 72 to close off the end 70 completely and the springs 76 are sufficiently yieldable and the gate 72 sufficiently movable on the rods 74 to insure complete engagement with the open end 70 of the tray and the complete closure thereof.

The two rods 74 are parallel and spaced-apart a distance slightly larger than the width of the tray 62, as shown more clearly in FIG. 9. On the sides 66 of the tray are secured two elongated, right-angle brackets 80 which slidably rest on the rods 74 such that the tray 62 can be moved longitudinally and horizontally.

The rods 74 are secured at the left-hand ends thereof to the bracket flange 24 by any suitable means such as a threaded connection. The rods 74 are made suitably strong that they can carry the weight of the tray 62 and any contents that may be therein.

The tray 62 as well as all the other parts described in the preceding are so sized and dimensioned as to position the conduit 20 as shown in the drawing and otherwise in a position at which the conduit opens into the tray 62. In FIG. 3, the tray 62 is shown as being moved to its extreme rightward position, at which it is closed off by the gate 72. In this closed position, the conduit 20 is shown as being disposed adjacent to the left-hand end of the tray and immediately thereabove.

The lower extremity of the conduit 20 is open at 82, a vertically adjustable, part-tubular plate 84 being secured to the inside of the conduit 20 for determining the height and size of the discharge opening 82. A screw 86 which fits into a vertical slot 88 in the conduit 20 (FIG. 9) provides for this vertical adjustment.

The lower rear side of the conduit 20 at the location indicated by the numeral 90 is closed and inclined as shown for the purpose of directing the flowable contents in the conduit 20 out of the discharge opening 82.

The parts described thus far are further sized and dimensioned such that when the power cylinder 28 is operated fully, the piston rod 34 retracts leftwardly as viewed in FIG. 3 a distance at which the open end 70 of the tray 62 just clears to the left the discharge end 82 of the conduit 20. This permits gravitational flow from the conduit 20 without any interference from the tray 62.

An electrical circuit diagram for operating the mechanism thus far described is shown in FIG. 10. In this diagram, like numerals indicate like parts. Three manually controlled, normally open switches are indicated by the numerals 92, 94, 96, the switches 94 and 96 being connected in series with the two normally closed switches 44 and 42, respectively. An electrical solenoid 98 connected in series with the power circuit 100 is operatively connected to a conventional air valve 102, which in turn is connected to the power cylinder 28. When the air valve 102 is actuated, air under pressure is introduced into the power cylinder 28 for moving the piston 30 in a leftward direction (as viewed in FIG. 3). When the air valve 102 is oppositely operated by de-energizing the solenoid 98, the air under pressure introduced in the power cylinder is exhausted to the atmosphere and the return spring in the power cylinder forces the piston 30 toward its extreme rightward position. Thus, by closing the switch 96, and with the microswitch 42 normally closed, the solenoid 98 is energized, thereby actuating the air valve 102. This results in the application of air under pressure to the right-hand end of the power cylinder 28, thereby moving the piston 30 as well as the piston rod 34 toward the left. This movement will continue until the cam 56 engages the switch arm 52, opening switch 42. Once this occurs, power to the solenoid 98 is cut off, thereby de-energizing the solenoid. The air valve 102 is deactuated and air under pressure to the power cylinder is cut off. This permits the return spring in the power cylinder to move the piston 30 toward the right. With the switch 96 remaining closed, as soon as the rightward movement of the piston 30 is sufficient, the cam 56 will leave the switch arm 52, thereby resulting in closure of the switch 42. The moment this switch closes, the solenoid 98 will once again be energized, thereby operating the power cylinder 28 once more. This reciprocal motion will continue and will have an excursion depending upon the parameters and dimensions used in the mechanism. In an operating embodiment of this invention, an excursion a fraction of an inch has been found practicable.

Since the switch 54 is spaced longitudinally from the switch 52, by leaving the two switches 92 and 96 open and closing only the switch 94, cam 56 will be caused to move a distance along with the piston 30 until the switch arm 54 is engaged. This will result in opening of switch 44 and the return of the piston 30 until the cam 56 leaves the switch arm 54. Once this happens, the switch 44 closes and the system is reactuated, causing return of the piston 30 as well as the cam 56. This reciprocal action continues in the vicinity of the switch 44 until the switch 94 is opened.

It will now be seen that by selectively operating the two switches 94 and 96, the piston 30 may be moved to a particular axial position within the cylinder 28, at which position it will be longitudinally vibrated.

The position of switch 42 corresponds to a position of the tray end 70, shown by the dashed line 104. Thus, by operating the switch 96, tray 62 will be moved rearwardly since it is attached to the piston rod 34 until the open tray end 70 reaches the position 104. At this position, tray 62 will be oscillated or reciprocated in a vibratory manner.

Likewise, if the switch 94 is operated, end 70 will be move to a position corresponding to the dashed line 106 and at this position will be vibrated. When the switch 92 is operated and the remaining two switches 94 and 96 are left open, the piston 30 will be completely retracted, thereby withdrawing the open end 70 of the tray 62 to a position at which it completely clears the conduit 20.

In operation, the switches 92, 94, 96 are normally open and the tray 62 is normally engaged with the shut-off gate 72. If it is assumed that flowable ingredients of finely divided particles are contained in the bins 14, and that it is desired to dispense a minute quantity of material from the upper bin 14 which is attached to the discharge conduit 18, suitable valving (not shown) is opened, thereby permitting some of the material in the bin 14 to gravitate through the conduit 18 and into the tray 62. Since the discharge opening 82 is situated inside and below the upper edges of the tray, only a certain amount of material will flow into the tray, at which time the flow will cease. Now, if switch 96 is operated, the tray will move rearwardly until the open end 70 moves to about the position 104 and at this position the tray will be vibrated longitudinally. This longitudinal vibration will result in the material being vibrated and dispensed out of the open end 70 in minute quantities. By positioning a conventional scale under the open end 70, when the desired weight of material has been dispensed, the switch 96 can be opened, thereby causing the tray 62 to move rightward until the open end 70 completely closes by engagement with gate 72.

A slightly higher rate of metering or dispensing is accomplished by actuating the switch 94, at which position the open end 70 of the tray moves to the position 106 and at this position vibrates. Since the position 106 is closer to the conduit 20 than is the position 104, it is obvious that more rapid dispensing of material from the tray 62 may be achieved.

For a maximum rate of dispensing, switch 92 is operated, thereby removing the tray 62 out of the gravitational discharge path of the conduit 20.

Since the housing 26 is made preferably airtight and dust-tight to minimize the hazard of explosion which could result from electrical sparks, certain modifications in the plungers and cam structure may be made for the purpose of preventing any volumetric change inside of the housing as the mechanism is operated. Further, the character of the vibratory action as well as the excursion length may be altered by varying the air pressure for the power cylinder 28. Additionally, a double-acting power cylinder may be used instead of the one shown and the two switches 42 and 44 so connected into an electrical circuit for the purpose of operating the power cylinder oppositely as the switches are engaged. All of these modifications are regarded as coming within the general concepts of the present invention.

As will now become apparent, the present invention makes possible the dispensing of material from overhead bins at various rates, large quantities of materials being dispensed at maximum rates and small quantities of materials being dispensed at minimum rates. This method of dispensing permits extreme accuracy in the metering of small quantities of material, such that formulations for compounds may be precisely followed.

While there have been described above the principles of this invention in connection with specific apparatus, it is to be clearly understood that this description is made only by way of example and not as a limitation to the scope of the invention.

What is claimed is:

1. Apparatus for controlling the flow of material comprising means for storing a quantity of flowable material, a material-supply conduit connected to said means and having a delivery end, a material-feeding device disposed adjacent to said delivery end for receiving material from said conduit, means for moving said device with respect to said delivery end of said conduit, said device being movable between two different delivery positions respectively corresponding to different rates of flow from said device, means for stopping the movement of said device in a selected one of said two delivery positions, gate means for terminating the flow of material from said device, said gate means alternatively being movable with respect to said device into positions respectively closing-off and permitting flow of material from said device, means for actuating said moving means to vibrate said device in a selected one of said delivery positions and for moving said gate means into said flow-permitting position substantially concurrently therewith, and means, including said last-mentioned means, for de-actuating said moving means to terminate the vibration of said device and for substantially concurrently therewith moving said gate means into said closing-off position whereby accurate quantities of material can be delivered from said device.

2. The apparatus of claim 1 wherein said material-feeding device includes an elongated tray-like element having a substantially horizontal bottom and upstanding sides, said element having opposite ends, one end being closed and the other open, said conduit being disposed with its delivery end adjacent to said element for emptying material thereinto whereby material may flow from said conduit into said element and out of the open end of the latter.

3. The apparatus of claim 1 wherein said material-feeding device includes an elongated tray-like element having a substantially horizontal bottom and upstanding sides, said element having opposite ends, one end being closed and the other open, said conduit being disposed with its delivery end adjacent to said element for emptying material thereinto whereby material may flow from said conduit into said element and out of the open end of the latter, said gate means including a closure member supported in a position to be contacted by the open end of said tray-like element for closing the latter, and means yieldably urging said closure member into engagement with said open end when said element contacts said closure member.

4. Apparatus for controlling the flow of material comprising means for storing a quantity of flowable material, a material supply conduit connected to said means and having a delivery end, a material-feeding device disposed adjacent to said delivery end for receiving material from said conduit, said device having a delivery portion, means connected to said device for adjusting the position of said delivery portion with respect to said conduit, means vibrating said device in any given adjusted position for dispensing material in said device from said delivery portion, means for terminating positively the dispensing of material from said delivery portion, said material-feeding device including an elongated tray-like element having a substantially horizontal bottom and upstanding sides, said element having opposite ends, one end being closed and the other open, said conduit being disposed with its delivery end adjacent to said element for emptying material thereinto whereby material may flow from said conduit into said element and out of the open end of the latter, said adjusting and vibrating means including a fluid power cylinder having a piston therein, a rod connecting said piston to said tray-like element for moving the latter longitudinally in response to reciprocal movement of said piston, means for controlling the position of said piston in said cylinder, and means for imparting to said piston reciprocating movement having an excursion shorter than the full-stroke of said piston in said cylinder.

5. The apparatus of claim 4 wherein said adjusting and vibrating means includes a valve for controlling the operation of said piston, said valve being connected to said cylinder, a cam device connected to said tray-like element for movement therewith, and means responsive to reciprocal movement of said cam device for causing reciprocal operation of said valve and said piston.

6. The apparatus of claim 4 wherein said adjusting and vibrating means includes a valve for controlling the operation of said piston, said valve being connected to said cylinder, a cam device connected to said tray-like element for movement therewith, a first electrical switch which is normally closed fixedly positioned adjacent to the path of movement of said cam device, said switch having an operating part engageable by said cam device for opening said switch, and means responsive to the opening and closing of said switch for causing reciprocal operation of said valve and said piston.

7. The apparatus of claim 6 but including a second electrical switch like said first switch but spaced therefrom in the path of movement of said cam device, said second switch having an operating part engageable by said cam device for opening said second switch, and means responsive to the opening and closing of said first and second switches individually for causing reciprocal operation of said valve and vibratory operation of said piston in a position corresponding to the one of said switches being operated by said cam device.

8. The apparatus of claim 6 but including a second electrical switch like said first switch but spaced therefrom in the path of movement of said cam device, said second switch having an operating part engageable by said cam device for opening said second switch, and means responsive to the opening and closing of said first and second switches individually for causing reciprocal operation of said valve and vibratory operation of said piston in a position corresponding to the one of said switches being operated by said cam device, said power cylinder and said switches being enclosed within a substantially airtight housing for the minimizing of the hazard of explosion.

References Cited

UNITED STATES PATENTS

| | | | |
|---|---|---|---|
| 420,424 | 1/1890 | Hinkle | 222—199 |
| 2,045,502 | 6/1936 | Wade | 222—199 X |
| 2,423,110 | 7/1947 | Mosshart | 222—200 X |

ROBERT B. REEVES, *Primary Examiner.*

STANLEY H. TOLLBERG, *Examiner.*